United States Patent [19]
Yoneda

[11] Patent Number: 5,480,177
[45] Date of Patent: Jan. 2, 1996

[54] CHAIR

[75] Inventor: Yoshifumi Yoneda, Osaka, Japan

[73] Assignee: Aprica Kassai Kabushiki Kaisha, Osaka, Japan

[21] Appl. No.: 413,484

[22] Filed: Mar. 30, 1995

[30] Foreign Application Priority Data

Apr. 4, 1994 [JP] Japan .................... 6-066100

[51] Int. Cl.⁶ ..................... B62B 7/06
[52] U.S. Cl. ..................... 280/642; 280/649
[58] Field of Search ............. 280/638, 35, 38, 280/641, 642, 647, 649, 650, 657, 658

[56] References Cited

U.S. PATENT DOCUMENTS 5,131,719  7/1992  Kassai ..................... 280/649

FOREIGN PATENT DOCUMENTS 3506077  8/1985  Germany ................. 280/642

4-32148  3/1992  Japan.

Primary Examiner—Richard M. Camby
Attorney, Agent, or Firm—W. G. Fasse; W. F. Fasse

[57] ABSTRACT

In a chair which can change the height of its seat by changing cross angles formed by a pair of first leg members and a pair of second leg members which are rotatably connected with each other at intermediate portions thereof respectively, a caster mounting member is mounted on a lower end portion of each leg member to be rotatable about a horizontally directed axis, and a rotary yoke of a caster is mounted on the caster mounting member to be rotatable about a vertically directed axis. The caster mounting member is connected with a leg mounting member by a connecting link, thereby defining a parallel crank mechanism by the leg member, the leg mounting member, the caster mounting member and the connecting link. Thus, the casters which are mounted on lower end portions of at least either the first or second leg members can regularly serve functions thereof properly regardless of change in inclination of the leg members.

5 Claims, 11 Drawing Sheets

CHAIR

BACKGROUND OF THE INVENTION

1. Field of the Invention

The present invention relates to a chair, and more particularly, it relates to a chair having a height-controllable seat which is suitable for seating a baby thereon.

2. Description of the Background Art

A childcare chair for seating a baby preferably has a height-controllable seat. The nurser can face to the baby at a proper distance by controlling the height of the seat in response to the situation, thereby readily taking good care of the baby. When the seat is brought into a high position, the nurser can readily suckle or change the baby in a sitting or standing state. When the seat is brought into a low position, on the other hand, the nurser can readily suckle or change the baby while sitting directly on the floor, and the baby can be safely kept when it is fast asleep.

Such a height-controllable chair is described in Japanese Utility Model Laying-Open No. 4-32148 (1992), for example, This chair comprises a seat, a pair of first leg members and a pair of second leg members supporting the seat with respect to the floor face, first leg mounting members rotatably mounting upper end portions of the first leg members on the seat, second leg mounting members rotatably mounting upper end portions of the second leg members on the seat, and wheels which are rotatably mounted on lower end portions of the first and second leg members respectively to roll on the floor face. The first and second leg members are rotatably connected with each other at intermediate portions thereof respectively, while the first and second leg mounting members are held by the seat so that the distances therebetween are changeable.

In the chair having the aforementioned structure, it is possible to change the height of the seat in the following manner: The distances between the first and second leg mounting members are so changed as to change the cross angles between the first and second leg members. Thus, inclinations of the first and second leg members are changed respectively, thereby changing the height of the seat.

Due to the wheels which are mounted on the lower end portions of the leg members, it is possible to readily move the aforementioned chair to an arbitrary position while seating the baby. Due to the wheels, further, it is possible to readily move the first and leg members with respect to the floor face, whereby the height of the seat can be readily controlled.

Noting the function of the wheels facilitating the movement of the chair to an arbitrary position, the wheels are more preferably provided by casters, which can automatically turn wheels in response to change of the direction for moving the chair. Thus, it is possible to readily move the chair also along a winding path.

When casters are mounted on the lower end portions of the leg members forming the chair having the aforementioned structure, however, the chair encounters the following problem: Such casters comprise rotary yokes rotatably holding wheels, and these rotary yokes must be mounted to be rotatable about vertically directed axes, in order to allow turning of the wheels. Also when the casters are mounted on lower end portions of leg members forming a chair, the rotary yokes must be mounted on the leg members to be rotatable about vertically directed axes.

In the chair having the aforementioned structure, on the other hand, it is necessary to change the inclinations of the leg members, in order to change the height of the seat. When the inclinations of the leg members are thus changed, the rotation axes of the rotary yokes are disadvantageously displaced from the vertical direction although the same are correctly vertically directed when the leg members are at specific inclinations. Depending on the inclinations of the leg members, therefore, the rotary yokes are so hard to rotate that it is difficult to turn the wheels, leading to damage in function of the casters.

SUMMARY OF THE INVENTION

Accordingly, an object of the present invention is to provide a structure for solving the aforementioned problem in a chair comprising casters.

The present invention is directed to a chair comprising a seat, a pair of first leg members and a pair of second leg members supporting the seat with respect to the floor face, first leg mounting members rotatably mounting upper end portions of the first leg members on the seat, second leg mounting members rotatably mounting upper end portions of the second leg members on the seat, and wheels which are rotatably mounted on lower end portions of the first and second leg members respectively to roll on the floor face, while the first and second leg members are rotatably connected with each other at intermediate portions thereof respectively, and the first and second leg mounting members are held by the seat so that the distances therebetween are changeable.

In such a chair, the wheels which are mounted on either the first or second leg members are provided by casters, and the present invention is characterized in that the following structure is employed in order to solve the aforementioned problem:

A rotary yoke rotatably holding the wheel of each caster is mounted on a caster mounting member, which is mounted on the lower end portion of the related leg member to be rotatable about a horizontally directed axis, to be rotatable about a vertically directed axis. This caster mounting member is connected with the leg mounting member mounting the leg member which is provided with the caster by a connecting link, whereby a parallel crank mechanism is defined by the leg member, the leg mounting member, the caster mounting member and the connecting link.

According to the aforementioned parallel crank mechanism, it is possible to maintain a parallel relation between the leg mounting member and the caster mounting member regardless of change in inclination of the leg member.

According to the present invention, therefore, it is possible to maintain the rotation axis of the rotary yoke which is provided on the caster to be regularly vertically directed, also when the inclination of the leg member is changed in order to change the height of the seat. Thus, the caster can regularly properly serve its function regardless of the inclination of the leg member.

According to the present invention, the connecting link may be bent to further approach the leg member, or partially covered with the leg member. In this case, it is possible to arrange the connecting link in an inconspicuous state, to attain a further preferable appearance of the chair.

On the other hand, the connecting link may be formed to extend linearly. In this case, it is possible to improve the strength of the connecting link, thereby further strengthening the mounting state of the caster mounting member.

When all wheels are provided by casters so that caster mounting members and connecting links are provided in relation to all of the first and second leg members in the present invention, it is possible to further readily move the chair to an arbitrary position.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
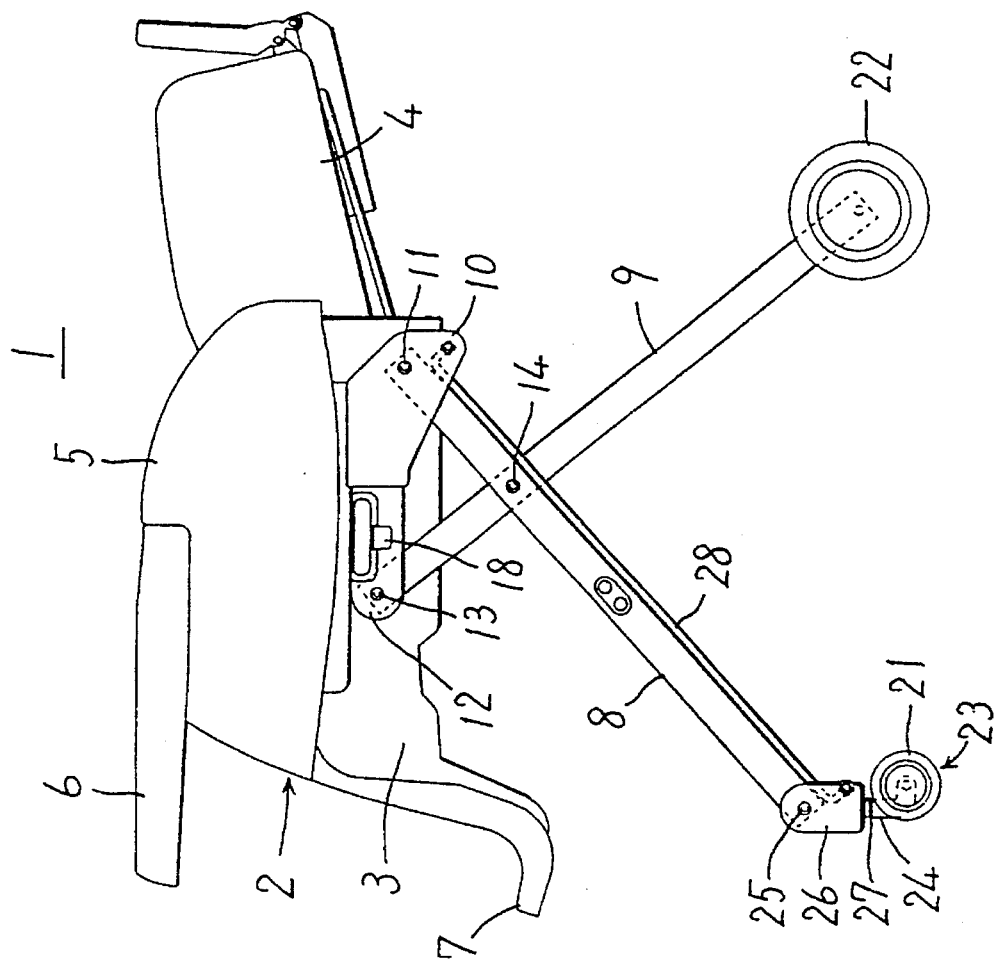
FIG. 1 is a front elevational view showing a chair 1 according to a first embodiment of the present invention, with a seat 2 which is brought into the highest position.
Figure 2:
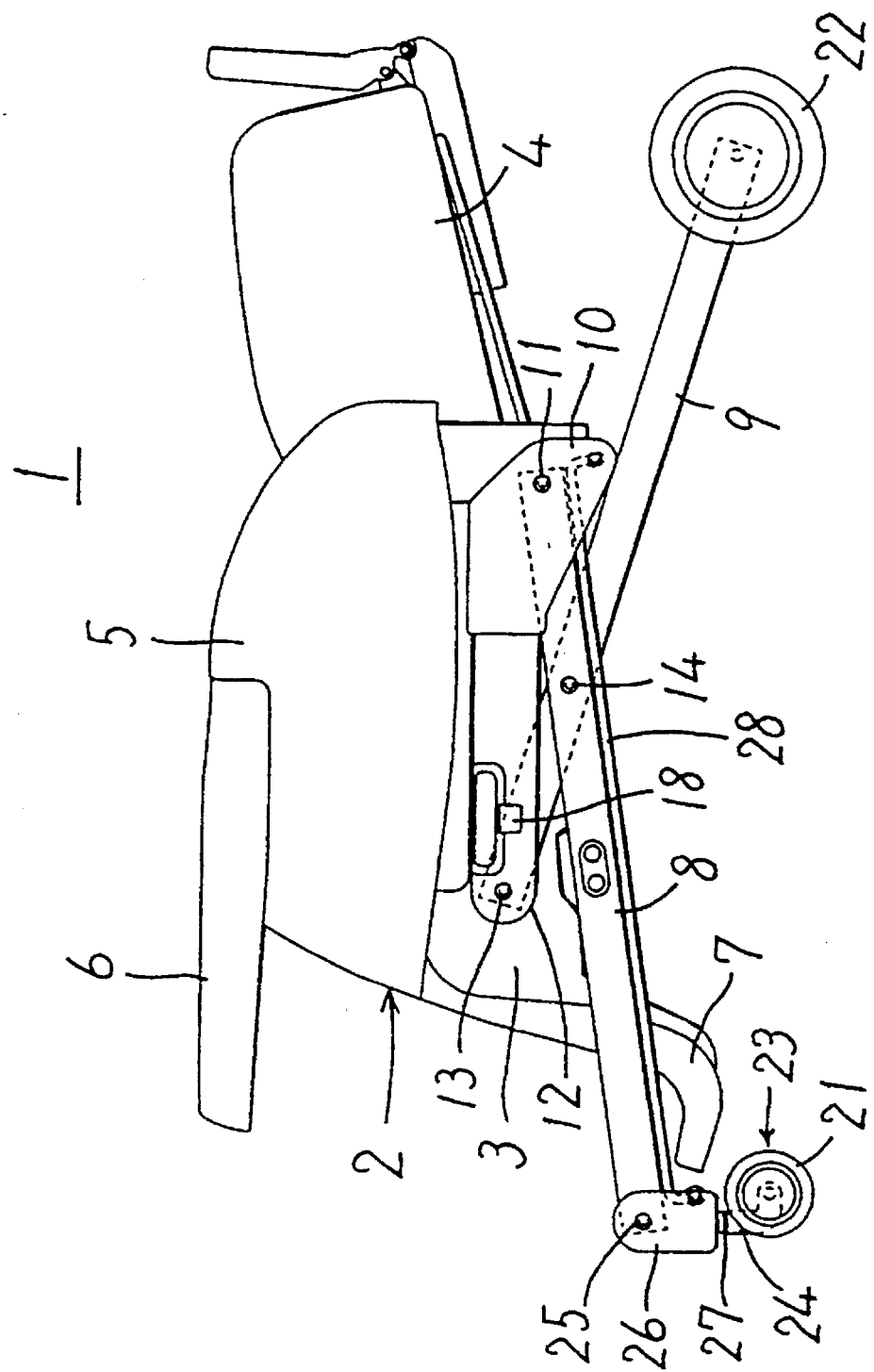
FIG. 2 is a front elevational view showing the chair 1 appearing in FIG. 1, with the seat 2 which is brought into the lowest position.

FIGS. 1 to 4 are adapted to illustrate a first embodiment of the present invention. In relation to a seat 2 of a chair 1 which is shown in these figures, FIG. 1 shows a state in the highest position, and FIG. 2 shows a state in the lowest position.

As shown in FIGS. 1 and 2, the seat 2 comprises a seat portion 3 and a backrest portion 4. The backrest portion 4, which is preferably changeable in angle of inclination, is illustrated in the most inclined state in these figures. Side walls 5 are positioned on both sides of the seat poriton 3, while a table 6 is mounted to extend across the side walls 5. Further, a footrest 7 is provided to downwardly extend from a front end of the seat portion 3.

This chair 1 basically has a horizontally symmetrical structure. Therefore, the elements shown in FIGS. 1 to 4 are provided in horizontally symmetrical pairs respectively.

Figure 3:
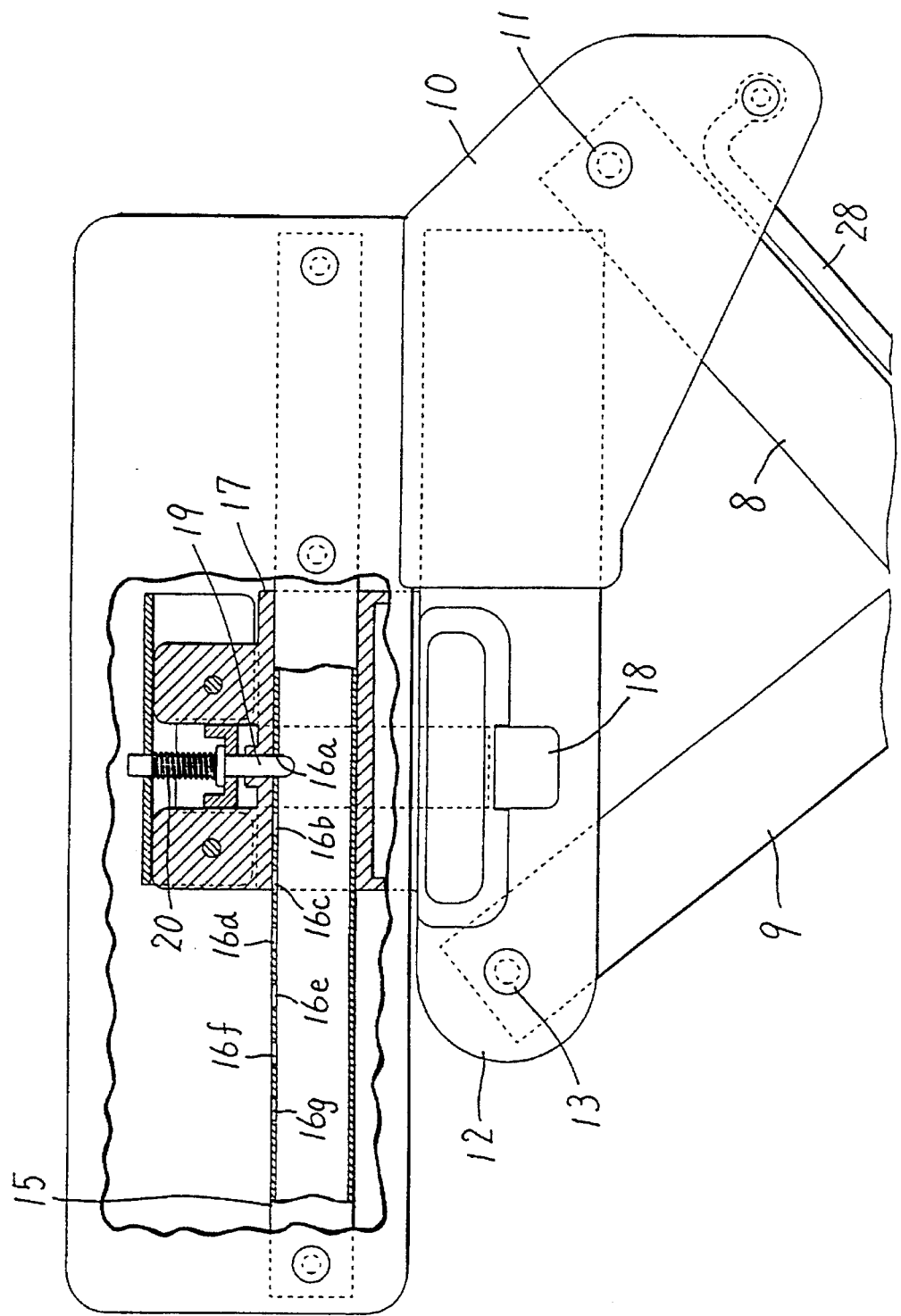
FIG. 3 is an enlarged view showing a portion around upper end portions of first and second leg members 8 and 9 which are in the state shown in FIG. 1 in a partially fragmented manner.
Figure 4:
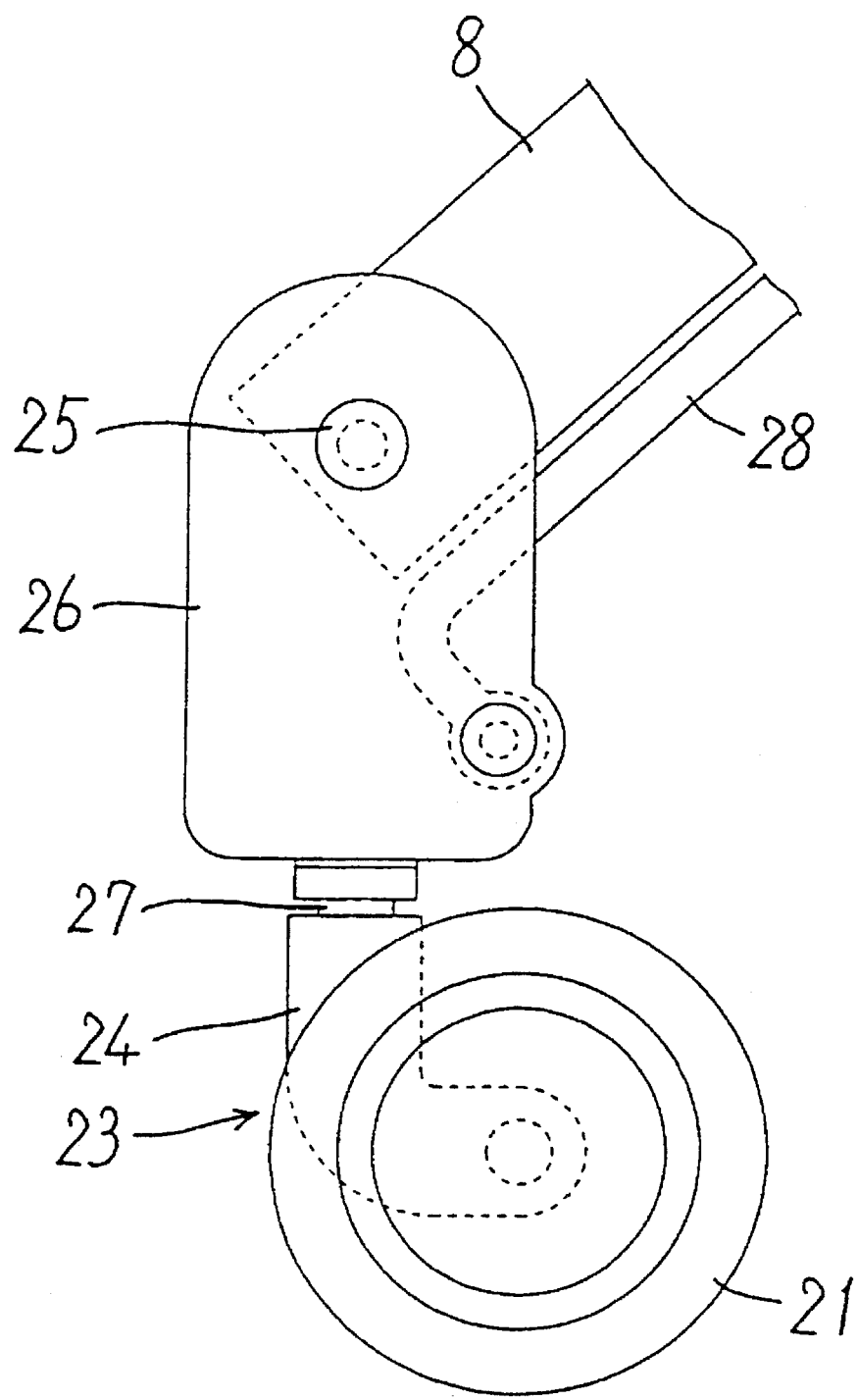
FIG. 4 is an enlarged view showing a lower end portion of the first leg member 8 which is in the state shown in FIG. 1.

The seat 2 is supported by a pair of first leg members 8 and a pair of second leg members 9 with respect to the floor face (not shown). FIG. 3 illustrates upper end portions of each of the first and second leg members 8 and 9, and FIG. 4 illustrates a lower end portion of each first leg member 8.

The upper end portion of each first leg member 8 is connected to a first leg mounting member 10 through a pin 11, thereby being rotatably mounted on the seat 2. On the other hand, the upper end portion of each second leg member 9 is connected to a second leg mounting member 12 through a pin 13, thereby being rotatably mounted on the seat 2. These first and second leg members 8 and 9 are rotatably connected with each other through a pin 14 at intermediate portions thereof respectively.

Comparing FIGS. 1 and 2 with each other, it is understood that each first leg mounting member 10 and each second leg mounting member 12 are held by the seat 2 so that the distance therebetween is changeable. In this case, either one of the first and second leg mounting members 10 and 12 may be fixed to the seat 2 so that the other one is movable with respect thereto, or both of the first and second leg members 10 and 12 may be movable with respect to the seat 2. According to this embodiment, the first leg mounting member 10 is fixed to the seat 2, while the second leg mounting member 12 is movable with respect to the seat 2.

In more detail, a horizontally extending guide bar 15 is fixed in each side wall 5, as shown in FIG. 3. The guide bar 15 is formed by a pipe having a square section, for example, and provided with a plurality of, e.g., seven engagement holes 16a to 16g which are distributed along its longitudinal direction. A slider 17 is arranged to be slidable along the guide bar 15. This slider 17 is connected with the second leg mounting member 12, which in turn is movable along the guide bar 15 in response to a sliding operation of the slider 17.

An operating member 18 is held by the slider 17, to be vertically movable with respect to the slider 17. A lower end portion of the operating member 18 is exposed on an outer side surface of the second leg mounting member 12. An engagement pin 19 is provided on an upper end portion of the operating member 18 for engagement with any of the engagement holes 16a to 16g, and urged in a direction to be engaged with any of the engagement holes 16a to 16g, thereby downwardly displacing the operating member 18.

When the seat 2 is at the highest position as shown in FIG. 1, the engagement pin 19 is engaged with the rightmost engagement hole 16a, as shown in FIG. 3. Due to this engagement, the position of the second leg mounting member 12 with respect to the seat 2 is fixed.

In order to reduce the height of the seat 2 from the state shown in FIG. 1, on the other hand, the operating member 18 is upwardly pushed. Thus, the engagement pin 19 is disengaged from the engagement hole 16a, so that the slider 17 is slidable along the guide bar 15. Due to such a sliding operation of the slider 17 along the guide bar 15, the cross angle between the first and second leg members 8 and 9 is so changed as to change the height of the seat 2. When the seat 2 reaches a desired vertical position, the force applied to the operating member 18 is so removed as to forcibly engage the engagement pin 19 in any of the engagement holes 16b to 16g due to an action of a spring 20.

When the seat 2 is brought into the lowest position as shown in FIG. 2, for example, the engagement pin 19 is engaged with the leftmost engagement hole 16g appearing in FIG. 3, so that the second leg mounting member 12 is fixed to the seat 2 in this state.

In order to readily move such a chair 1 to an arbitrary position, wheels 21 and 22 for rolling on the floor face are rotatably mounted on the lower end portions of the first and second leg members 8 and 9 respectively. In these wheels 21 and 22, the wheels 21 are provided by casters 23 in this embodiment.

Each caster 23 comprises a rotary yoke 24 which rotatably holds each wheel 21, as shown in FIG. 4 in an enlarged manner. Further, a caster mounting member 26 is mounted on the lower end portion of each first leg member 8 to be rotatable about a horizontally directed axis 25. The rotary yoke 24 is mounted on the caster mounting member 26 to be rotatable about a vertically directed axis 27. It is important that this axis 27 is regularly correctly directed to the vertical direction regardless of the inclination of the first leg member 8, and the following structure is employed in order to enable this:

The first leg mounting member 10 and the caster mounting member 26 are connected with each other by a bar-shaped connecting link 28, for example. Thus, a parallel crank mechanism is defined by the fist leg member 8, the first leg mounting member 10, the caster mounting member 26 and the connecting link 28. Comparing FIGS. 1 and 2 with each other, it is understood that the parallel relation between the first leg mounting member 10 and the caster mounting member 26 is therefore maintained also when the inclination of the first leg member 8 is changed, whereby the axis 27 is regularly maintained in the vertically directed state. Consequently, the function of the caster 23 is properly maintained regardless of the inclination of the first leg member 8.

In the aforementioned embodiment, the connecting link 28 is bent on both end portions thereof to further approach the first leg member 8. Therefore, it is possible to make the connecting link 28 inconspicuous, thereby attaining a preferable appearance of the chair 1.

Figure 5:
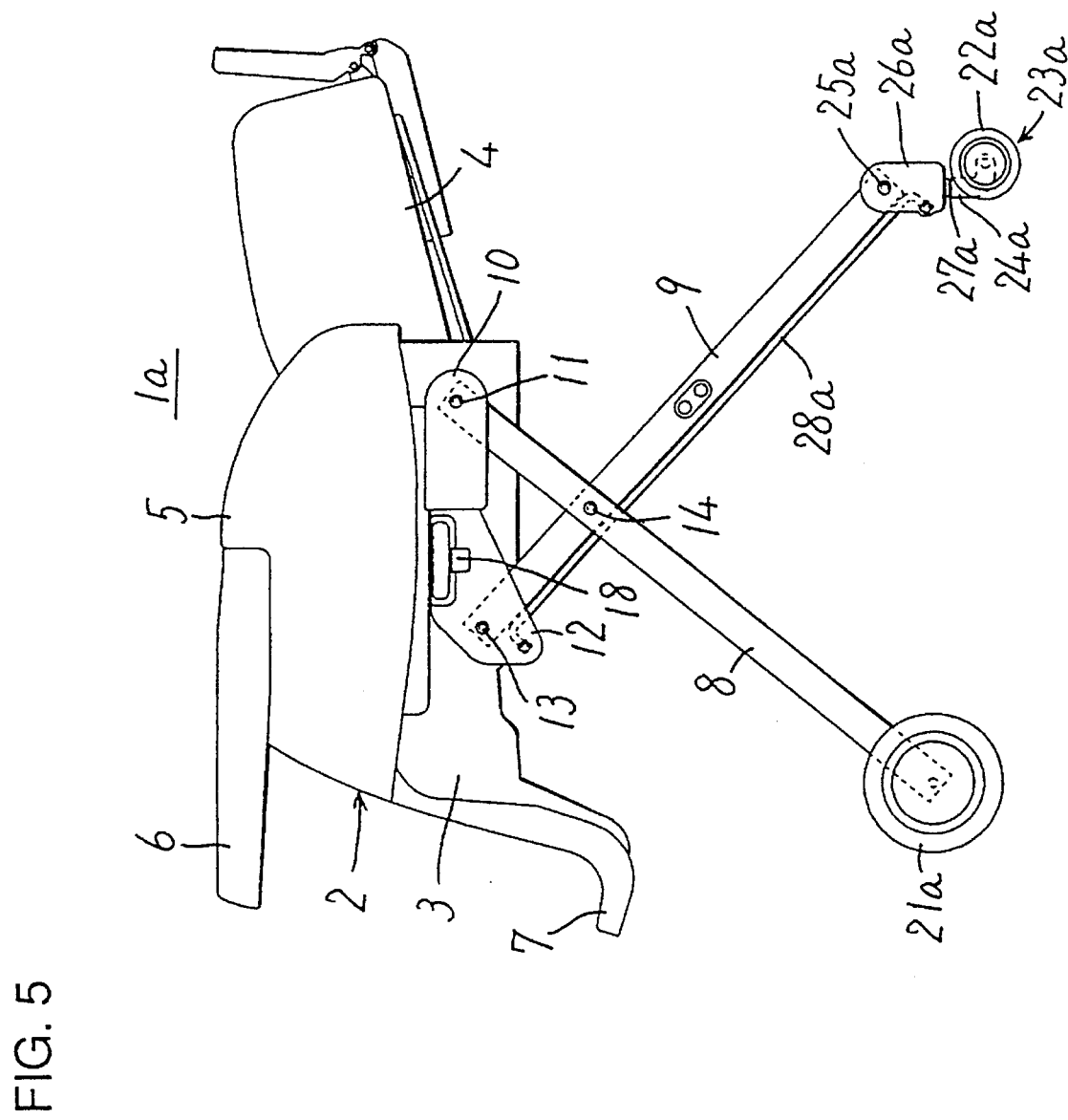
FIG. 5 is a diagram corresponding to FIG. 1, showing a chair 1a according to a second embodiment of the present invention.

FIG. 5 is a diagram corresponding to FIG. 1, showing a chair 1a according to a second embodiment of the present invention. Referring to FIG. 5, elements corresponding to those shown in FIG. 1 are denoted by similar reference numerals, to omit redundant description.

In the chair 1a shown in FIG. 5, a wheel 21a which is provided on a lower end portion of each first leg member 8 is of an ordinary type, while a wheel 22a which is mounted on a lower end portion of each second leg member 9 is provided by a caster 23a. According to this embodiment, therefore, a caster mounting member 26a and a connecting link 28a are provided in relation to the second leg member 9. The caster mounting member 26a, which mounts a rotary yoke 24a of the caster 23a to be rotatable about a vertically directed axis 27a, is mounted on the second leg member 9 to be rotatable about a horizontally directed axis 25a.

Figure 6:
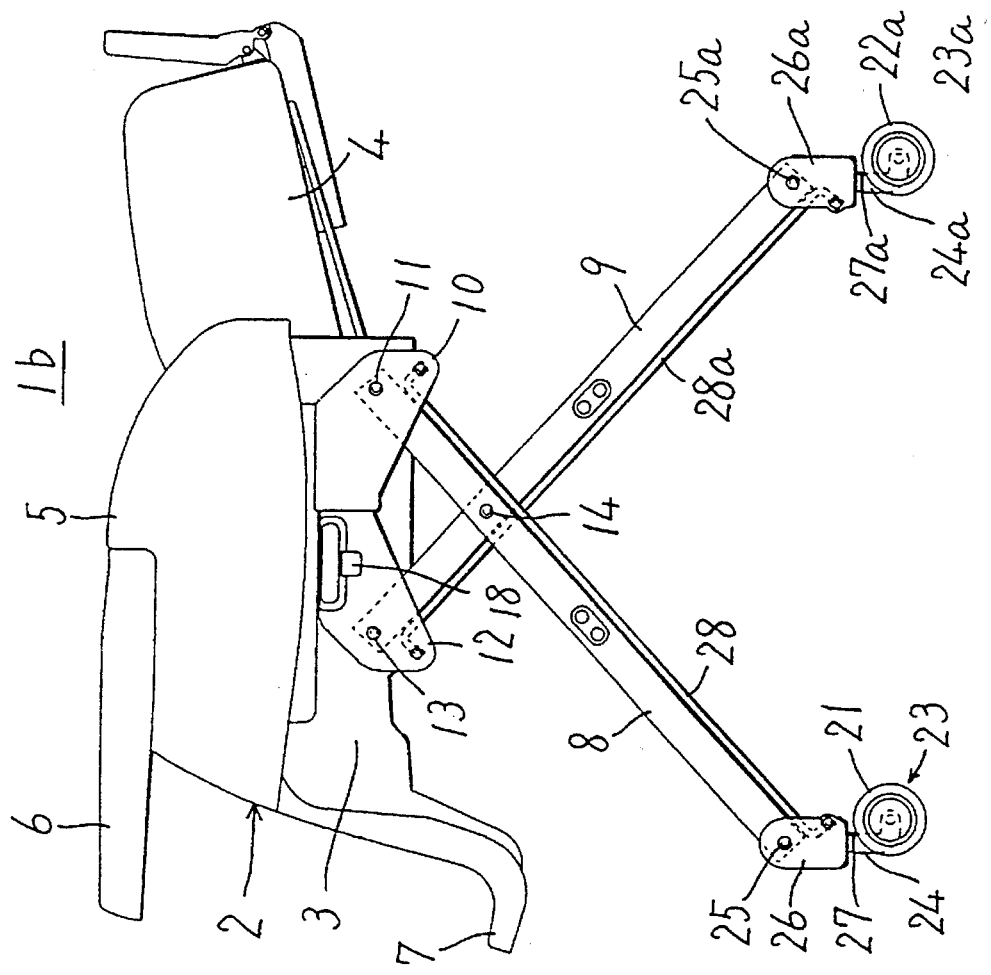
FIG. 6 is a diagram corresponding to FIG. 1, showing a chair 1b according to a third embodiment of the present invention.

FIG. 6 is a diagram corresponding to FIGS. 1 and 5, showing a chair 1b according to a third embodiment of the present invention. Referring to FIG. 6, elements corresponding to those shown in FIG. 1 or 5 are denoted by similar reference numerals, to omit redundant description.

The embodiment shown in FIG. 6 is characterized in that all wheels 21 and 22a are provided by casters 23 and 23a. Therefore, caster mounting members 26 and 26a and connecting links 28 and 28a are provided in relation to all of first and second leg members 8 and 9. The embodiment shown in FIG. 6 can be regarded as a combination of the embodiments shown in FIGS. 1 to 4 and FIG. 5. According to the embodiment shown in FIG. 6, it is possible to further readily move the chair 1b to an arbitrary position.

Figure 7:
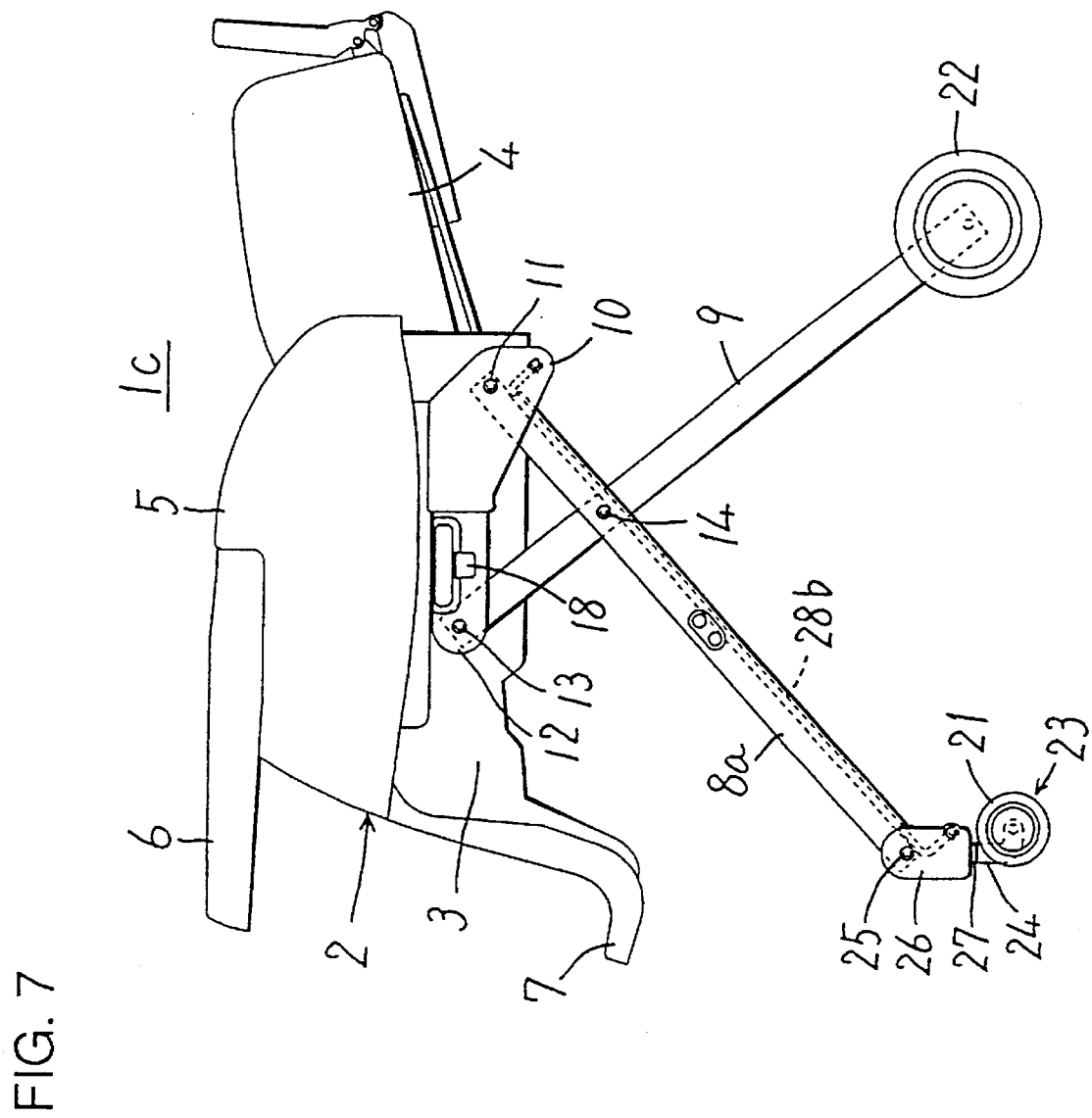
FIG. 7 is a diagram corresponding to FIG. 1, showing a chair 1c according to a fourth embodiment of the present invention.
Figure 8:
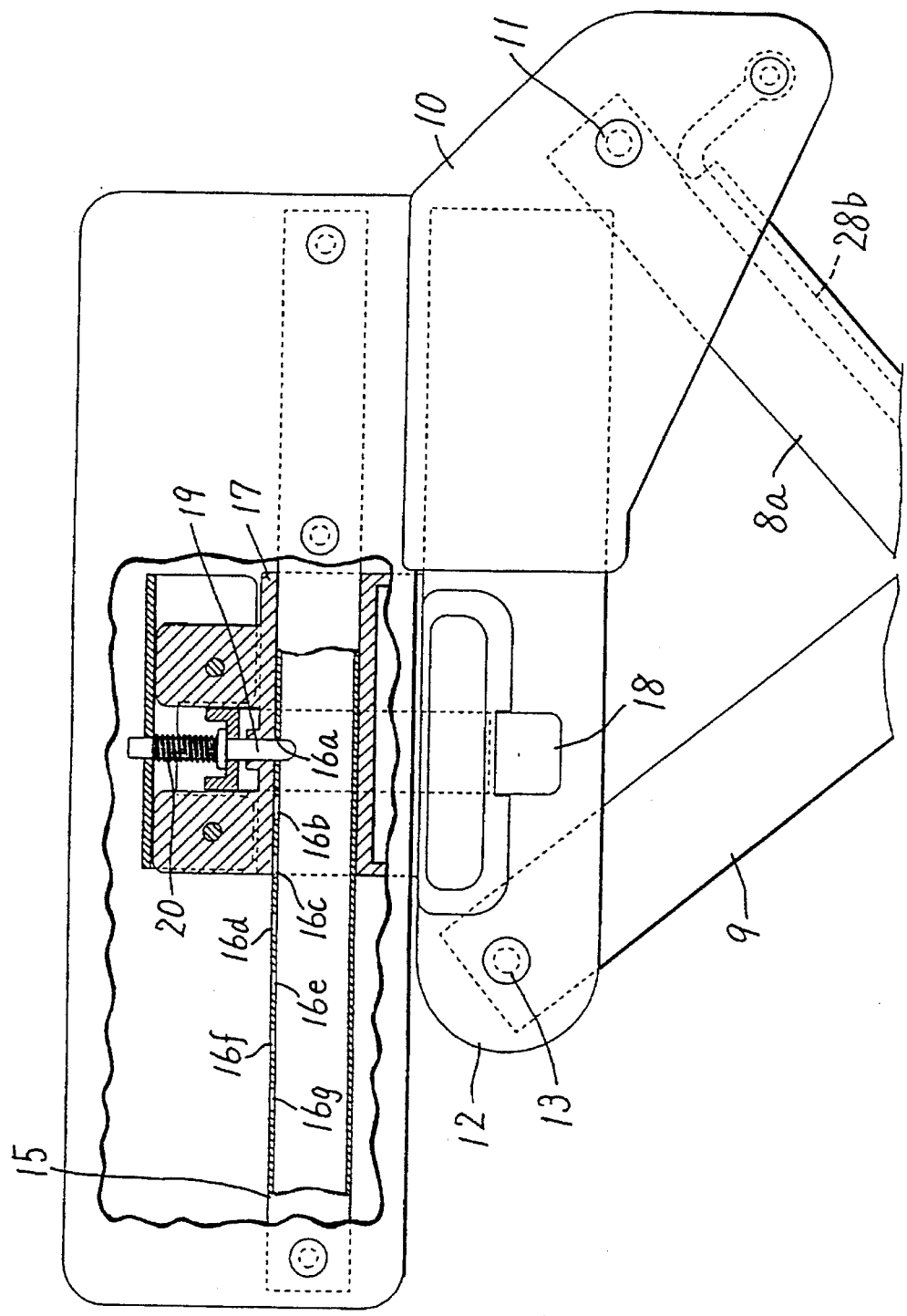
FIG. 8 is a diagram corresponding to FIG. 3, showing a portion around upper end portions of first and second leg members 8a and 9 which are in the state shown in FIG. 7 in a partially fragmented manner.
Figure 9:
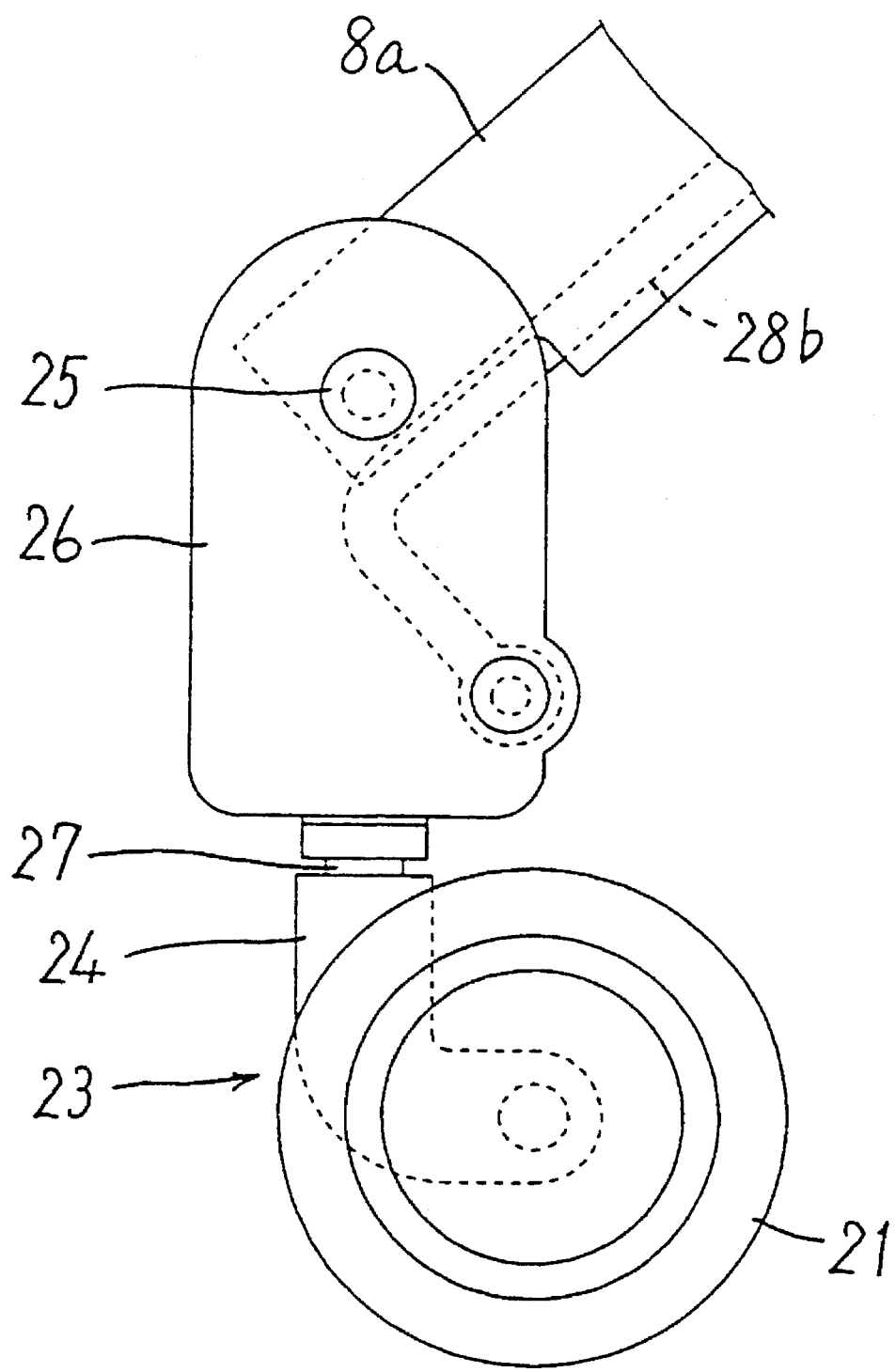
FIG. 9 is a diagram corresponding to FIG. 4, showing a lower end portion of the first leg member 8a which is in the state shown in FIG. 7.

FIGS. 7, 8 and 9 are adapted to illustrate a fourth embodiment of the present invention, in correspondence to FIGS. 1, 3 and 4 respectively. Referring to FIGS. 7 to 9, elements corresponding to those shown in FIGS. 1 to 4 are denoted by similar reference numerals, to omit redundant description.

The feature of a chair 1c shown in FIGS. 7 to 9 resides in a positional relation between each first leg member 8a and each connecting link 28b, as compared with the chair 1 shown in FIGS. 1 to 4. Namely, the connecting link 28b is partially covered with the first leg member 8a. Thus, it is possible to make the connecting link 28b substantially invisible from the exterior, thereby attaining a further preferable appearance as compared with the chair 1 shown in FIGS. 1 to 4.

The first leg member 8a covering the connecting link 28b may have an inverted U-shaped section for receiving the connecting link 28b from its opening portion, or a closed section for completely enclosing the connecting link 28b.

The positional relation between the first leg member 8a and the connecting link 28b in the embodiment shown in FIGS. 7 to 9 is also applicable to both of the aforementioned embodiments shown in FIGS. 5 and 6 respectively.

Figure 10:
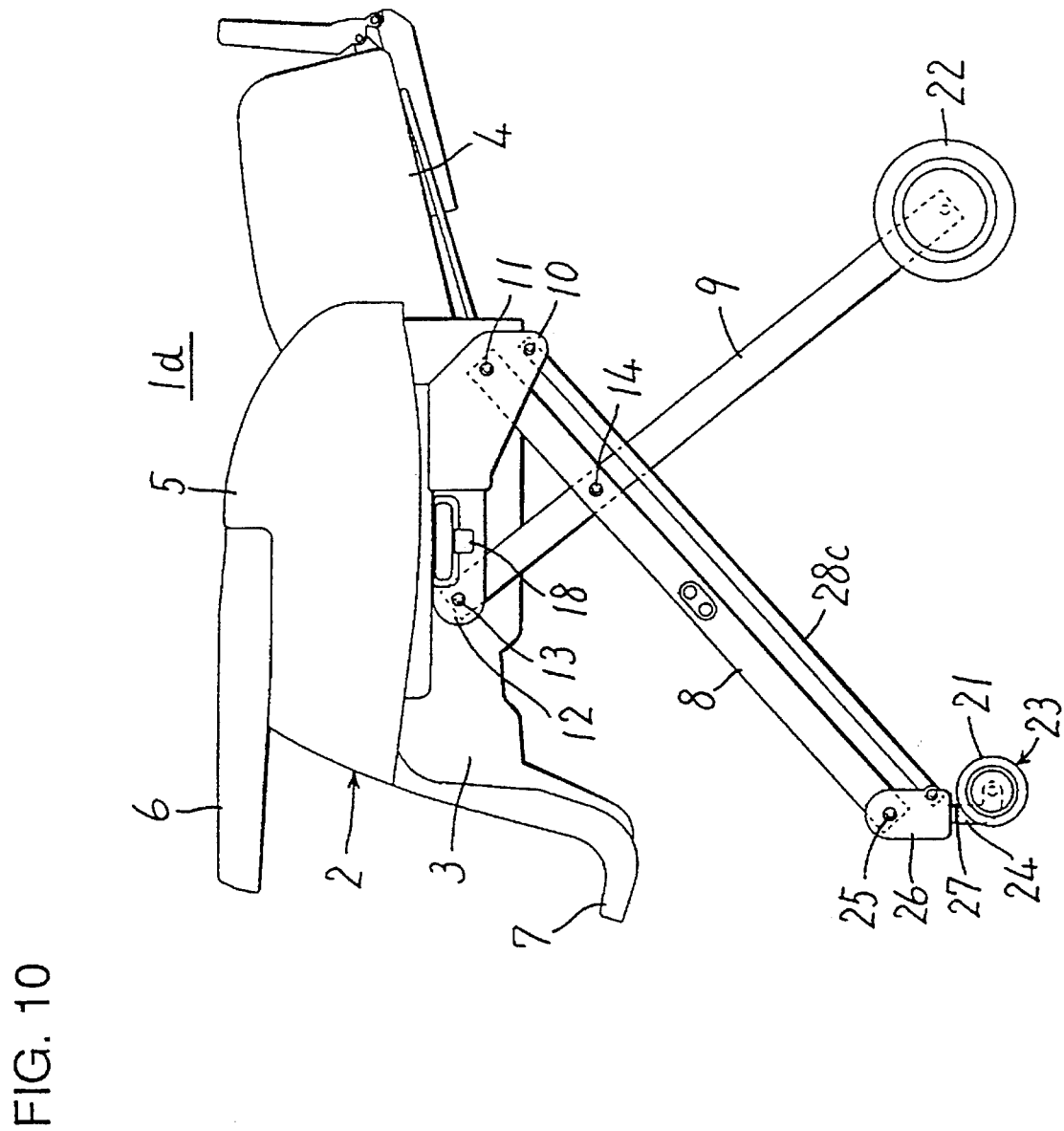
FIG. 10 is a diagram corresponding to FIG. 1, showing a chair 1d according to a fifth embodiment of the present invention.
Figure 11:
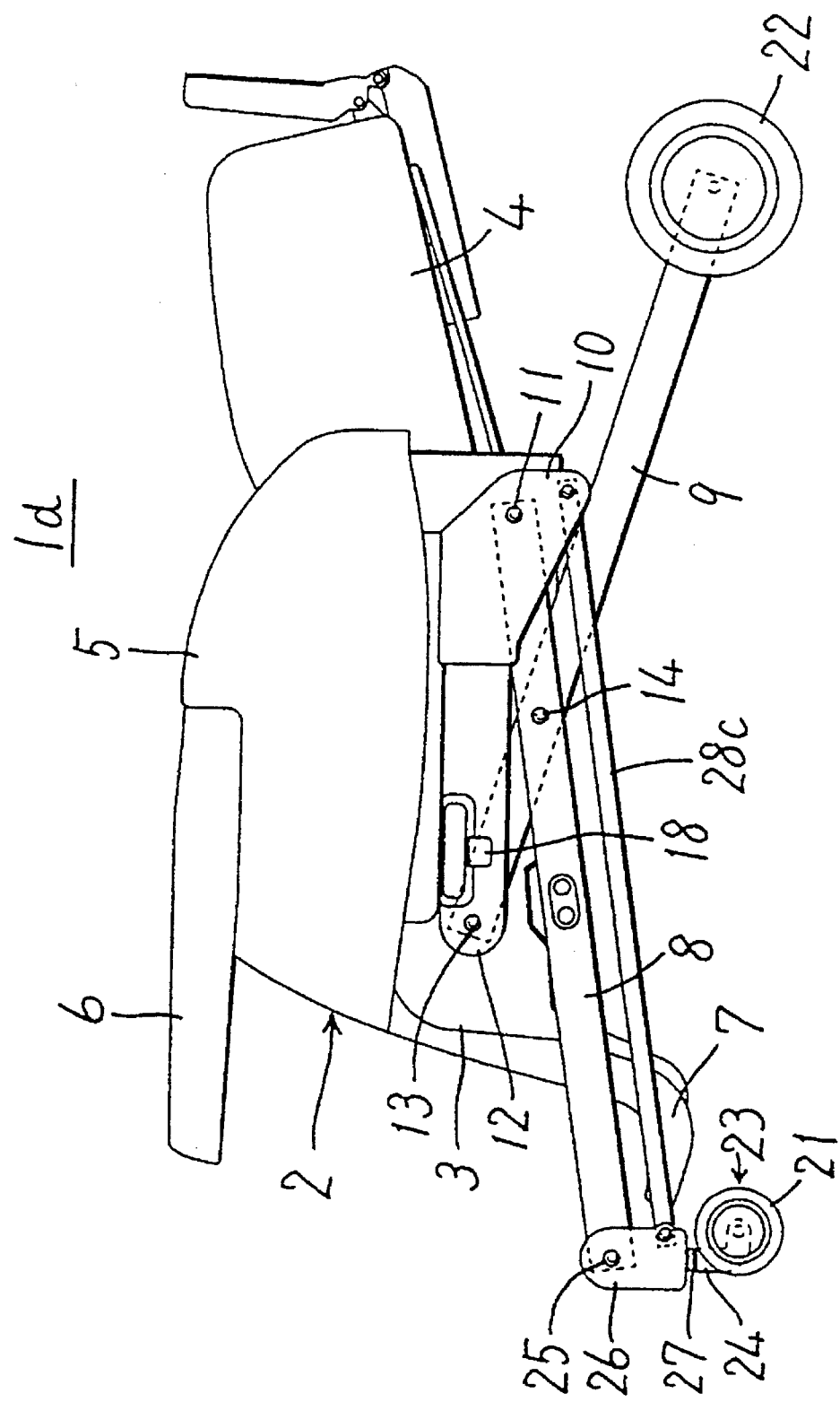
FIG. 11 is a diagram corresponding to FIG. 2, showing the chair 1d appearing in FIG. 10.

FIGS. 10 and 11 are diagrams corresponding to FIGS. 1 and 2 respectively, showing a chair 1d according to a fifth embodiment of the present invention. Referring to FIGS. 10 and 11, elements corresponding to those shown in FIGS. 1 and 2 are denoted by similar reference numerals, to omit redundant description.

The embodiment shown in FIGS. 10 and 11 is characterized in that each connecting link 28c extends linearly, as compared with the embodiment shown in FIGS. 1 to 4. When the connecting link 28c thus extends linearly, it is possible to improve the strength of the connecting link 28c thereby improving mounting strength of a caster mounting member 26, although the chair 1d is inferior in appearance.

The linear extension of the connecting link 28c shown in FIGS. 10 and 11 is also applicable to both of the aforementioned embodiments shown in FIGS. 5 and 6 respectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A chair comprising:

a seat;

a pair of first leg members and a pair of second leg members supporting said seat with respect to the floor face;

first leg mounting members rotatably mounting upper end portions of said first leg members on said seat;

second leg mounting members rotatably mounting upper end portions of said second leg members on said seat; and wheels being rotatably mounted on lower end portions of said first and second leg members respectively for rolling on the floor face, said first and second leg members being rotatably connected to each other at intermediate portions thereof respectively, said first and second leg mounting members being held by said seat so that the distances therebetween are changeable, wherein said wheels mounted to either said first or second leg members are casters, a rotary yoke rotatably holding each said caster wheel is mounted on a caster mounting member, being mounted on said lower end portion of each related said leg member to be rotatable about a horizontally directed axis, to be rotatable about a vertically directed axis, and said leg mounting member mounting each said leg member provided with said caster is connected with said caster mounting member by a connecting link, thereby defining a parallel crank mechanism by said leg member, said leg mounting member, said caster mounting member and said connecting link.

2. The chair in accordance with claim 1, wherein said connecting link is bent to further approach said leg member.

3. The chair in accordance with claim 1, wherein said connecting link is partially covered with said leg member.

4. The chair in accordance with claim 1, wherein said connecting link extends linearly.

5. The chair in accordance with claim 1, wherein all said wheels are provided by casters, said caster mounting members and said connecting links being provided in relation to all of said first and second leg members.

* * * * *